United States Patent [19]

Hileman et al.

[11] Patent Number: 5,284,502
[45] Date of Patent: Feb. 8, 1994

[54] ROTARY GLASS-MOLDING PRESS WITH CUSHIONED, TRUNNION MOUNTED HYDRAULIC DRIVE

[75] Inventors: Kenneth R. Hileman, Climax; Nile Limbaugh, Bainbridge, both of Ga.

[73] Assignee: Lynch Machinery - Miller Hydro, Cambridge, Ga.

[21] Appl. No.: 960,136

[22] Filed: Oct. 13, 1992

[51] Int. Cl.⁵ .............................................. G03B 11/02
[52] U.S. Cl. ........................................ 65/160; 65/308; 65/309; 65/311
[58] Field of Search ................. 65/237, 238, 242, 264, 65/248, 308, 309, 311, 246, 251, 160

[56] References Cited

U.S. PATENT DOCUMENTS 4,554,001  11/1985  Shields et al. ........................ 65/160
4,704,152  11/1987  Davey .................................. 65/308

OTHER PUBLICATIONS

Lynch Machinery Blueprint A-9787, Nov. 7, 1988.
Lynch Machinery Blueprint A-9904, Jan. 11, 1951.
Lynch Machinery Blueprint A-9919, Dec. 27, 1950.

*Primary Examiner*—Peter Chin
*Assistant Examiner*—Steven P. Griffin
*Attorney, Agent, or Firm*—Allegretti & Witcoff, Ltd.

[57] ABSTRACT

An automatic, rotary, glass-making press comprises a base, a rotary table mounted for rotation on the base, and glass-forming mechanisms on the table and base, for formation of glass articles at work stations around the press. A rotator is mounted for rotation to the base, and a drive pin is mounted to the rotator. The drive pin is advanced and retracted into engagement and out of engagement with the table. A rotator drive drives the rotator in reciprocating rotation, and includes opposed hydraulic drive and cushion cylinders mounted between the base and the rotator. The drive cylinder advances the rotator; the cushion cylinder cushions the advance, and returns the rotator to starting position. The drive and cushion cylinders are trunnion mounted to the base, for arcuate motion of the rods of the cylinders during rotary motion of the rotator. A control co-ordinates the advance and retraction of the drive pin and the drive and return of the rotator, for incremental forward advances of the press rotary table.

6 Claims, 7 Drawing Sheets

ROTARY GLASS-MOLDING PRESS WITH CUSHIONED, TRUNNION MOUNTED HYDRAULIC DRIVE

BACKGROUND OF THE INVENTION

This invention relates to industrial glass molding, and more particularly, to the drive mechanisms of rotary glass-molding presses.

The art of industrial glass molding has focused on high speed, constant operation, single article glass molding presses. While many useful glass molding presses have existed, the drives of some such machines have been subject to defeating wear under the necessary repetitive actions of the drives, and have included many components.

SUMMARY OF THE INVENTION

An object of the invention is a rotary glass making press having a substantially wear-free drive.

Another object of the invention is a rotary glass making press having a drive of a minimal number of components and actions.

Another object of the invention is a rotary glass making press having a drive which minimizes shock to glass articles in formation as the press operates.

These and other objects and advantages are most fully appreciated with a complete understanding of the preferred embodiment of the invention in the context of the art. Yet in summary, the invented automatic, rotary, glass making press comprises a base, a rotary table mounted for rotation on the base, and glass-forming mechanisms on the table and base, for formation of glass articles at work stations around the press. The press further comprises a rotator mounted for rotation to the base, a drive pin means for driving the table mounted to the rotator, and a drive pin advancing and retracting means. The last-stated means operates to advance and retract the drive pin means into engagement and out of engagement with the table. It is mounted to the rotator for movement with the rotator. The press still further comprises a rotator drive means for driving the rotator in reciprocating rotation. The rotator drive means including a first rod means for extending and retracting a first rod mounted between the base and the rotator. The first rod advancing the rotator during the extending of the first rod. The rotator drive means also includes a second rod means for extending a second rod mounted between the base and the rotator. The second rod retracts the rotator during extending of the second rod. The first and second rod means are mounted to the base and rotator for arcuate movements of the first and second rods as the rotator moves in reciprocating rotation about the base. The press is completed by control means for controlling the drive pin advancing and retracting means and the rotator drive means. In operation under direction of the control means, the first rod means advances the rotator while the drive pin means is in engagement with the table, thereby advancing the table, and the second rod means retracts the rotator while the drive pin means is out of engagement with the table, whereby the table is rotated forward in increments.

Attention is now directed to the preferred embodiment.

BRIEF DESCRIPTION OF THE DRAWING

The preferred embodiment of the invention will be described hereafter, in relation to the accompanying drawing. For ease of orientation to the drawing, the views of the drawing are briefly described as follows.

DETAILED DESCRIPTION OF THE PREFERRED EMBODIMENT

Figure 1:
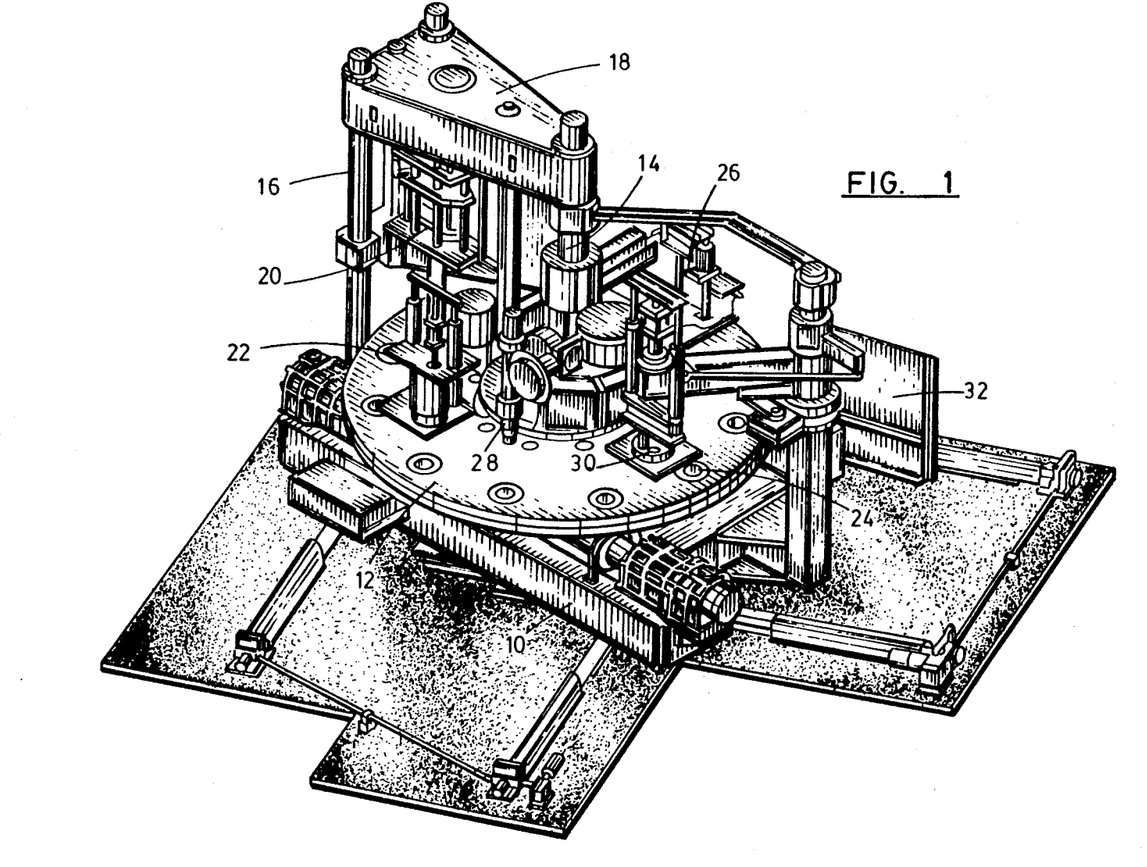
FIG. 1 is a perspective view of the preferred, automatic rotary glass-making press of the invention.
Figure 3:
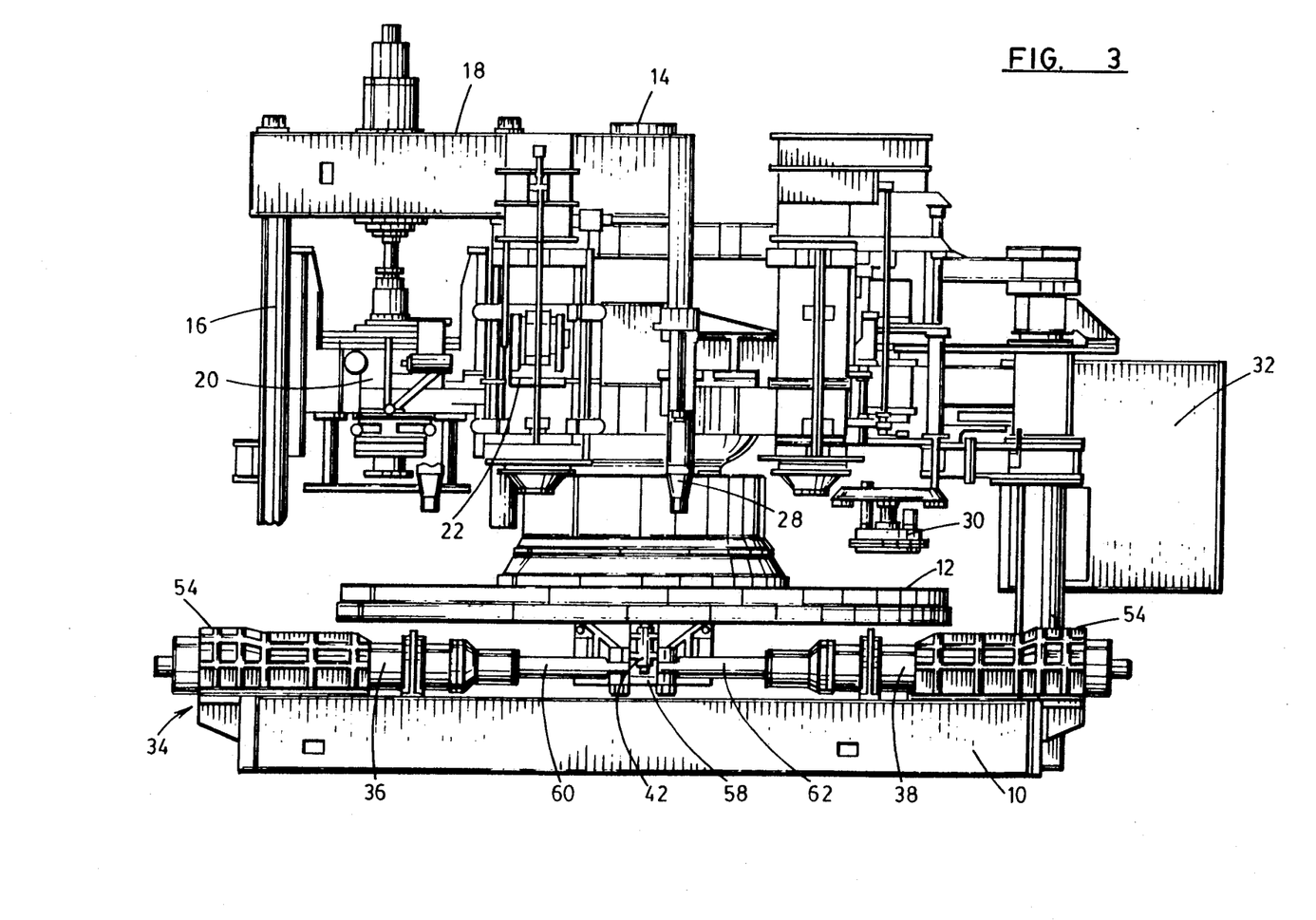
FIG. 3 is a side elevation view of the preferred press.

Referring to FIGS. 1 and 3, the preferred embodiment of the invented press includes a base 10. A circular rotary table 12 is mounted atop the base 10. A central column 14 extends upward from the table 12, defining the central, vertical axis about which the table 12 rotates. The central column 14 and two spaced side columns such as column 16 support a yoke 18. A press head 20 is extendable downward from the yoke 18, to the table 12. The press head 20 forms glass articles on the table 12. Additional glass-forming mechanisms and components around the table 12 include air former assemblies such as assembly 22, basket assemblies such as assembly 24, a shell transfer assembly 26, an article release assembly 28, and a take-out assembly 30 with its control panel 32.

Figure 2:
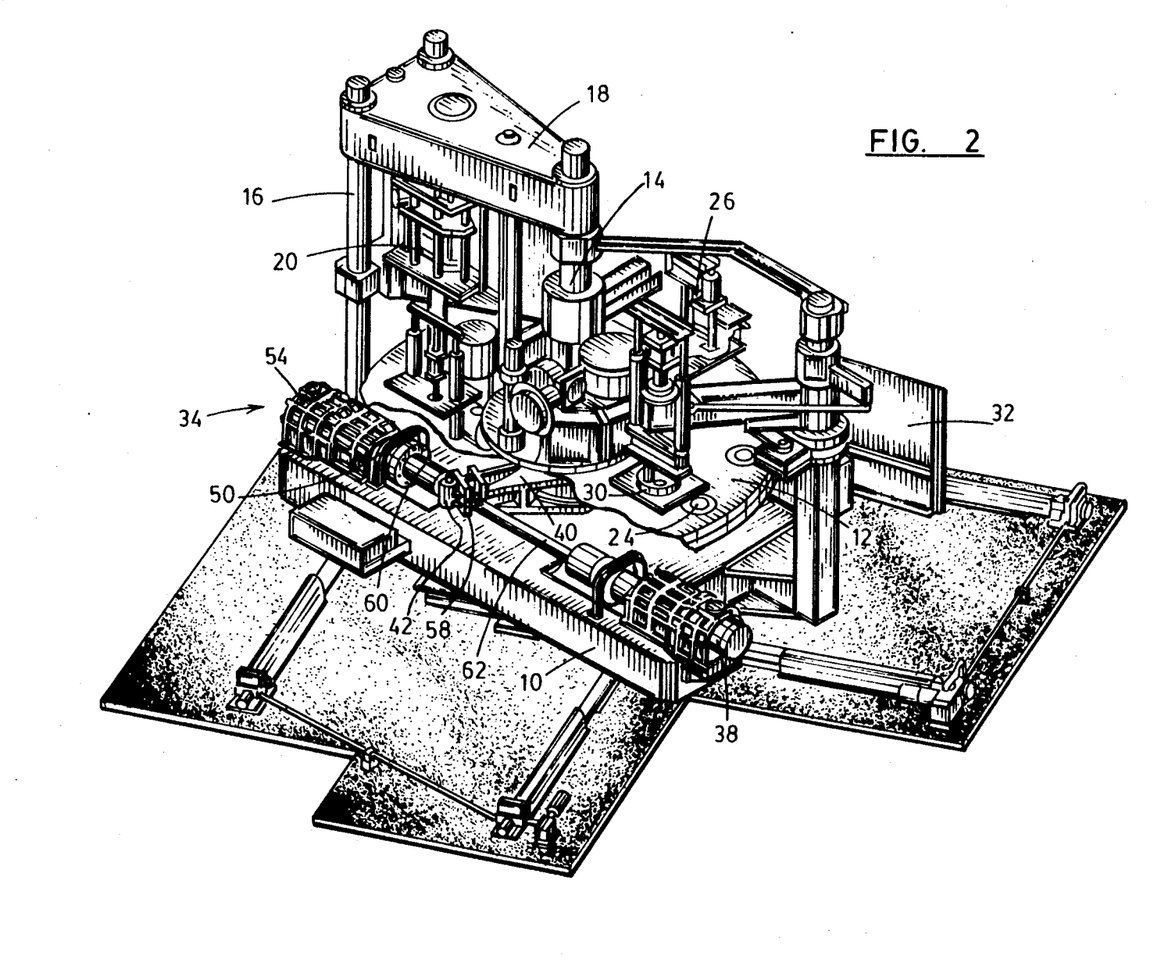
FIG. 2 is a perspective view of the preferred press, with a portion broken away to reveal the drive of the press.
Figure 4:
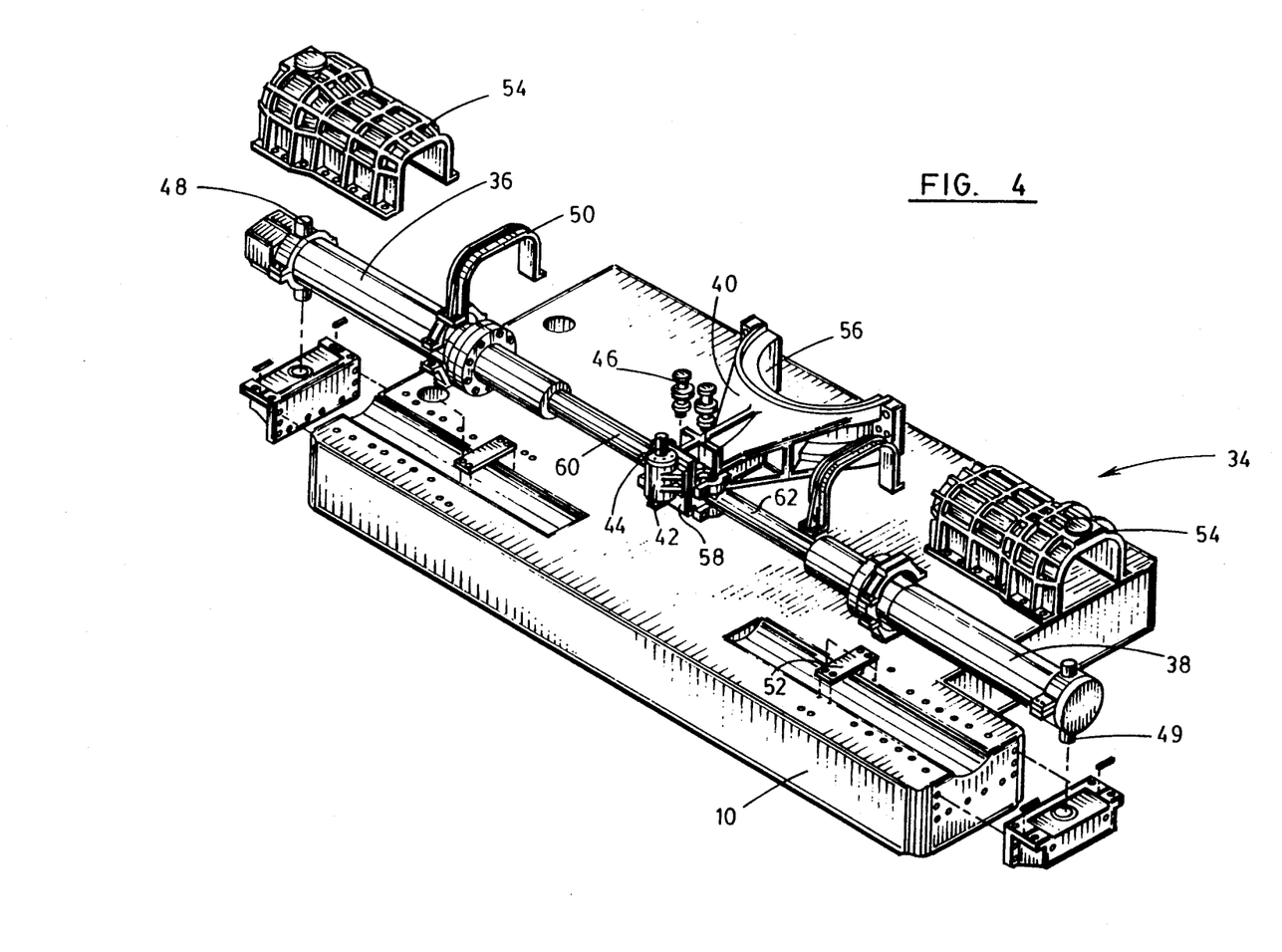
FIG. 4 is an exploded perspective view of the drive of the press.

Referring to FIGS. 2 and 3, the preferred press further includes a trunnion mounted hydraulic drive, generally designated 34. As shown best in the exploded view of FIG. 4, the drive 34 includes two opposed hydraulic cylinders 36, 38. In the position of FIG. 3 and 4, the cylinders seem aligned for linear motion only, but as will be described, the cylinders pivot relative to each other and are perfectly aligned with each other only in the position shown in FIGS. 3 and 4.

The drive 34 further includes a rotator arm 40, a drive pin cylinder assembly 42, a drive pin 44, rotator arm pins 46, trunnions 48, 49, associated brackets and plates such as 50, 52, and safety cages 54.

The rotator arm 40 includes a collar portion 56, which is mounted under the table 12 about the central column 14. The rotator arm 40 extends from the collar 56 outward of the central column to a distal, pin connector portion 58. The drive pin cylinder assembly 42 is mounted on the outer end of the arm 40, furthest from the central column 14, and immediately inward of the mounted drive pin cylinder assembly 42, the rotator arm pins 46 join the piston rods 60, 62 of the cylinders 36, 38 to the rotator arm 40. At the outer extremities of the cylinders 36, 38, the trunnions 48, 49 attach the cylinders 36, 38, respectively, to the base 10 for pivoting, also referred to as rotation.

As should already be apparent at this point, the mounting and orientation of the cylinders 36, 38, is such that when one piston rod such as rod 60 is extended from its cylinder such as 36, the opposite rod such as 62 of the opposite cylinder such as 38 must retract into its cylinder. Further, the linkage of the piston rods 60, 62 to the rotator arm 40, which must move in rotation about the central column 14, dictates that both cylinders 36, 38 pivot as the rods 60, 62 are extended and retracted. Thus, as the piston rod 60 of the cylinder 36 extends, and the opposed piston rod 62 retracts, the cylinder 36 rotates initially clockwise, and the opposed cylinder 38 also rotates clockwise, both directions of rotation being referenced from above. Opposite piston rod extension causes opposite rotation.

Each piston rod 60, 62 extends into its respective hydraulic cylinder 36, 38, and connects to a piston. The cylinders 36, 38 are single action cylinders, with external porting only at the outer ends of the cylinders, outward of the rods and pistons. The cylinders are driven in opposition to each other, with each one driven intermittently, to reciprocate the rotator arm 40. More specifically, the hydraulic control of the cylinders forces hydraulic fluid into the cylinder 36, driving the rod 60 to extend. While such extension is occurring, the cylinder 38 is idled and the rod 62 is allowed to retract. The opposite also occurs: when cylinder 38 is driven to drive rod 62 to extend, the cylinder 36 is idled and rod 60 is allowed to retract.

The action as described causes a rocking, or reciprocating rotation, of the rotator arm 40 and thereby of the drive pin cylinder assembly 42 and the drive pin 44. The action of the rotator arm 40 and pin 44 is transferred to the table 12, such that the table indexes forward, without rocking back. The hydraulic control of the cylinders 36, 38 is co-ordinated with the action of the drive pin 44. The drive pin 44 is extendable and retractable parallel to the axis of the table 12 and central column 14 under the action of the drive pin cylinder assembly 42. The drive pin 44 is selectively extended and retracted such that when the cylinder 36 is active to rotate the rotator arm 40, the drive pin 44 is extended upward to engage and drive the table 12. When the cylinder 38 is active to return the rotator arm 40 to its starting position, the pin 44 is retracted to disengage from the table 12, and leave the table 12 immobile. Repetitive cycling of the cylinders 36, 38 causes reciprocating motion of the rotator arm 40 and forward, indexed motion of the table 12.

Figure 5:
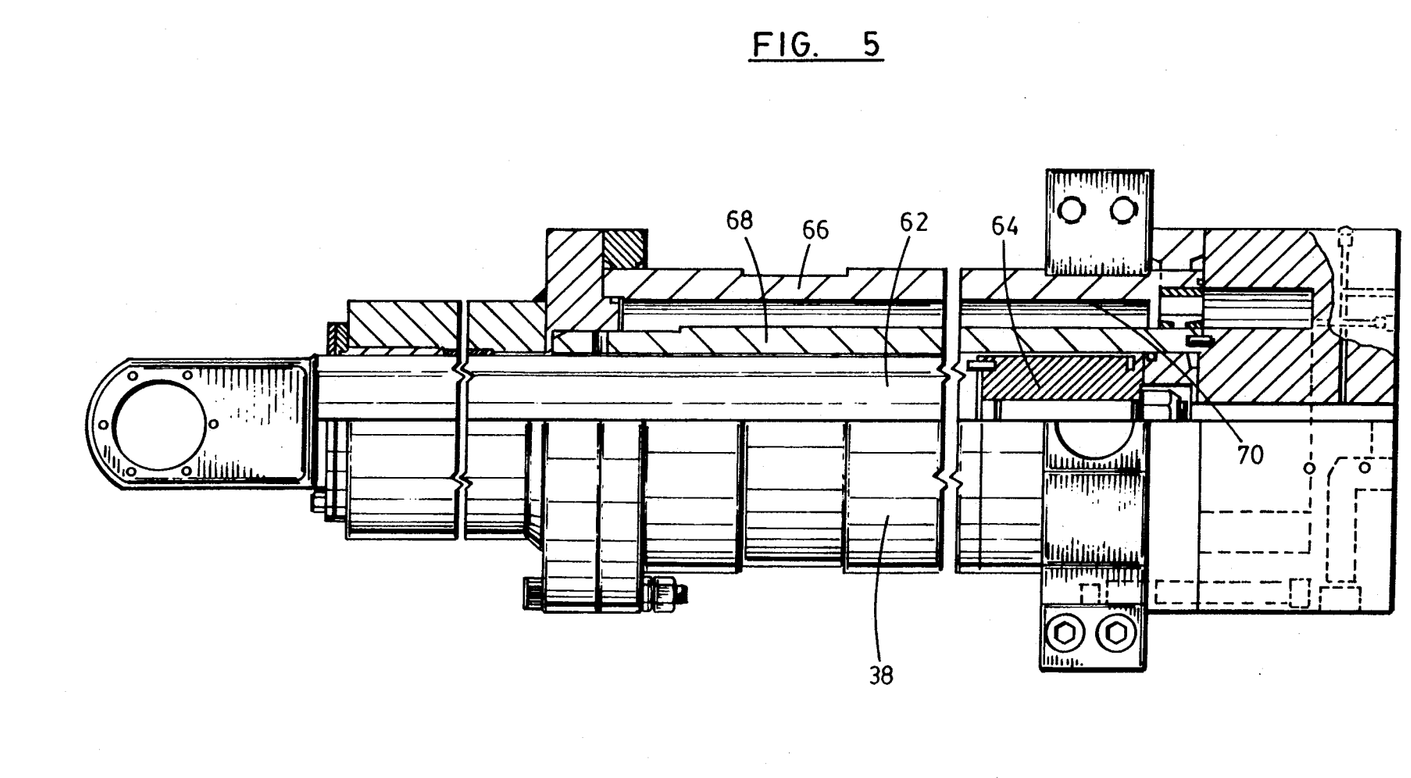
FIG. 5 is a top plan view of the cushion cylinder of the preferred embodiment, with half the view cut away along the cylinder centerline to reveal internal detail.

Referring to FIG. 5, the internal structure of the cylinder 38 is unique from the internal structure of the cylinder 36. As shown in the cutaway portion of FIG. 5, the cylinder 38 includes its piston rod 62, a piston 64 and the expected, external housing 66. Additionally, the cylinder 38 includes an inner sleeve 68, within the housing 66. The sleeve 68 is spaced internally from the housing 66, to create an annular fluid reservoir area 70 between the sleeve 68 and housing 66.

The piston 64 moves within the sleeve 68. The sleeve 68 is itself annular, as are the piston 64 and piston rod 62. The piston 64 and piston rod 62 have substantially the same outer diameter. The sleeve 68 is a clearance distance such as one-sixteenth of an inch from the piston 64 and piston rod 62.

Figure 6:
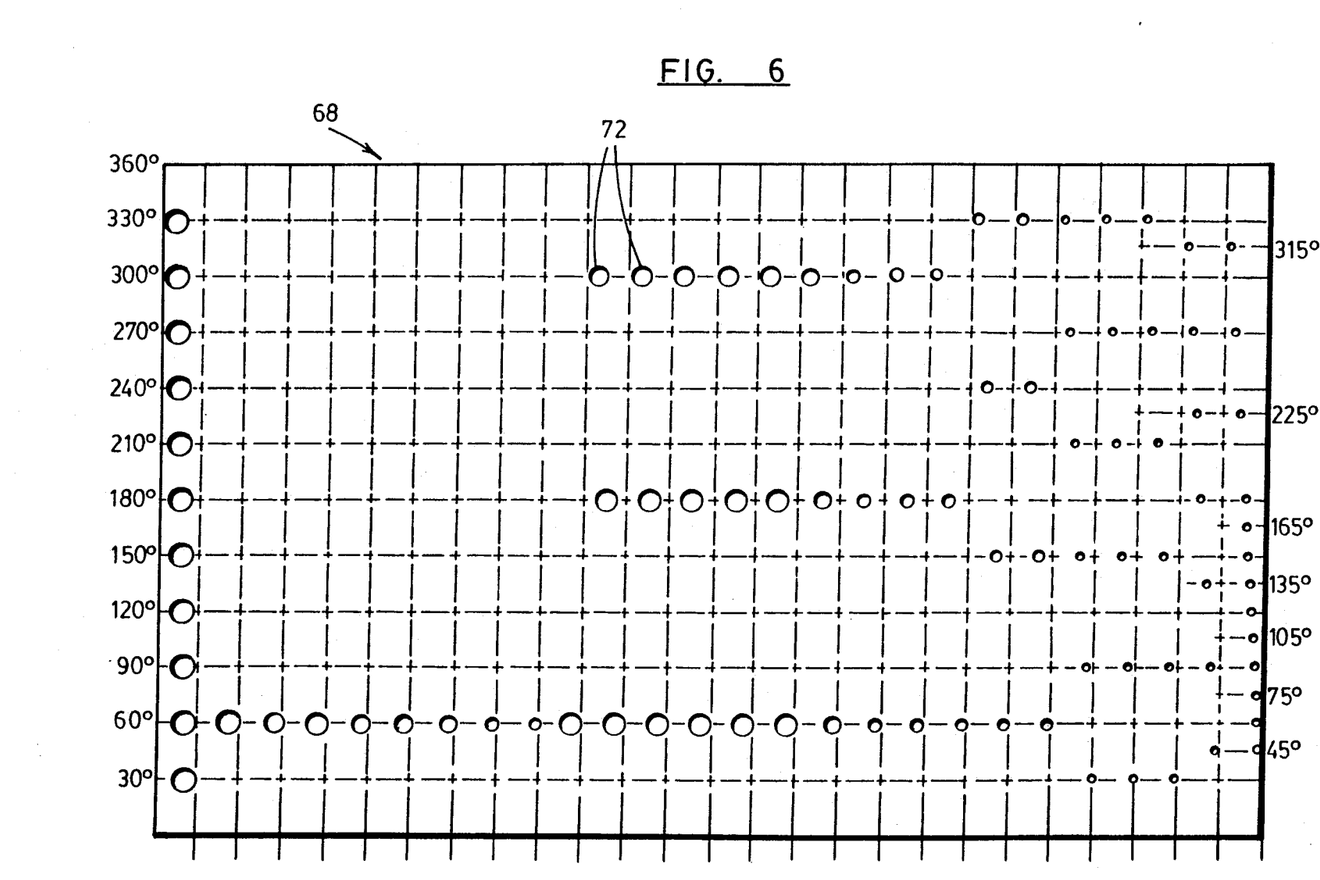
FIG. 6 is a view of an annular internal sleeve of the cushion cylinder having a predetermined hole pattern; the sleeve is shown as if it were cut and unrolled to be flat.
Figure 7:
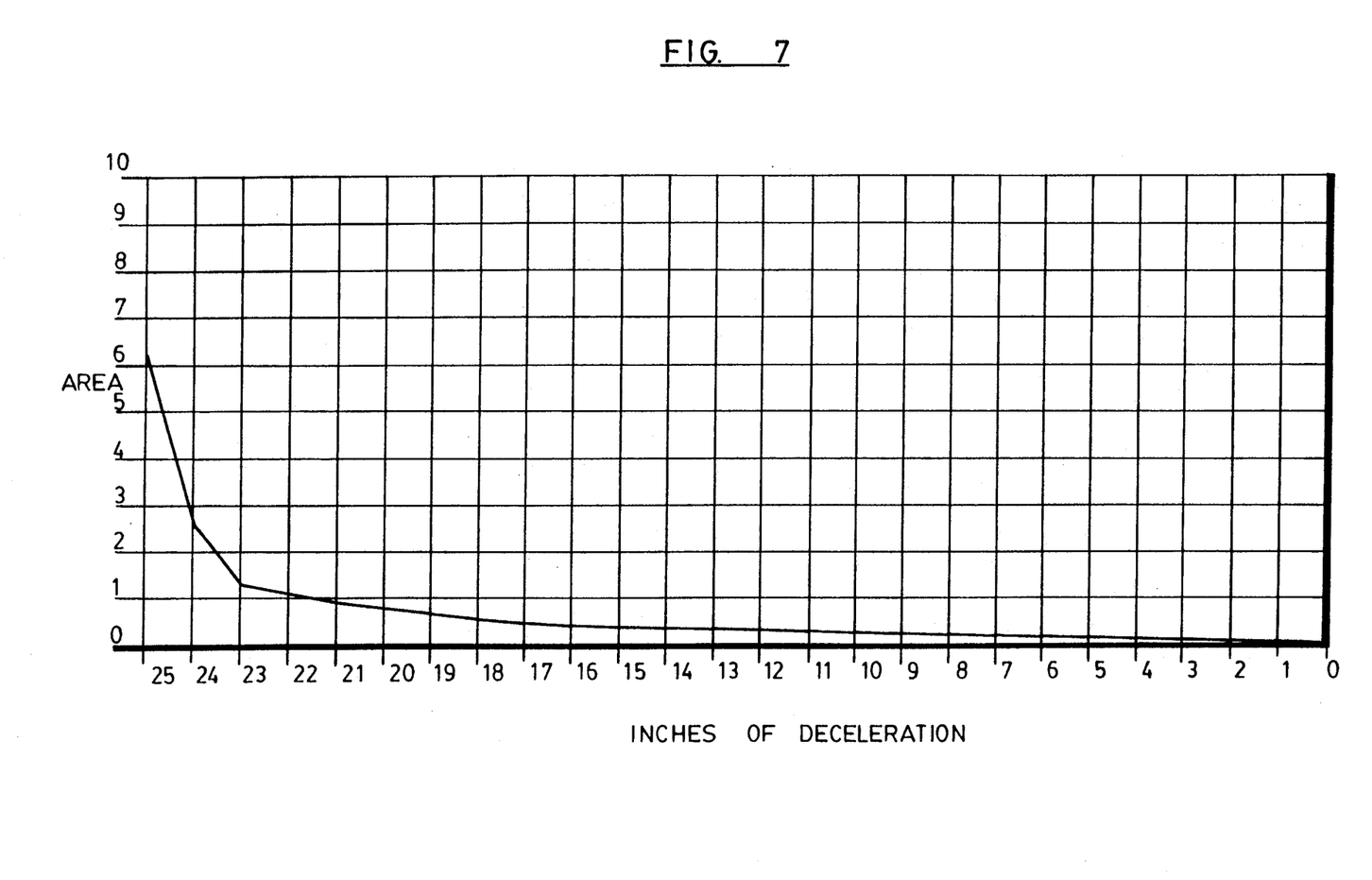
FIG. 7 is a deceleration curve which corresponds to the rate of deceleration for the cushion cylinder of the preferred embodiment.

Referring to FIG. 6, the sleeve 68 defines a plurality of ports such as ports 72 between the annular fluid reservoir area 70 and the interior of the inner sleeve 68. The spacing, number and size of the inner sleeve ports are selected such that on compression of the rod 62 within the cylinder 60, the torque follows the curve of FIG. 7. To accomplish the foregoing, in part, the ports are spaced such that as the piston and piston rod 64, 62 cover increasing numbers of the ports as the piston rod length within the cylinder increases. The combination of the piston 64, piston rod 62, inner sleeve 68, annular fluid reservoir 70 and ports such as 72 form a rotator cushion for cushioning movement of the rotator arm 40 while the first rod 60 advances the rotator 40. The motion is progressively cushioned as the ports are progressively covered.

The preferred embodiment of the invention is now described in such full, clear and concise manner as to allow a person of ordinary skill in the art to make and use the same. To particularly point out and distinctly claim the subject matter claimed as invention, the following claims conclude this description.

What is claimed is:

1. An automatic, rotary, glass-making press, the press comprising a base, a rotary table mounted for rotation on the base, and glass-forming mechanisms on the table and base, for formation of glass articles at work stations around the press, the press further comprising a rotator mounted on the base for rotation, a drive pin means mounted to the rotator for driving the table, a drive pin advancing and retracting means for advancing and retracting the drive pin means into engagement and out of engagement with the table and mounted to the rotator for movement with the rotator, a rotator drive means for driving the rotator in reciprocating rotation, the rotator drive means including a first rod means for extending and retracting a first rod mounted between the base and the rotator, the first rod advancing the rotator during the extending of the first rod, and a second rod means for extending a second rod mounted between the base and the rotator, the second rod retracting the rotator during extending of the second rod, the first and second rod means mounted to the base and rotator for arcuate movements of the first and second rods as the rotator moves in reciprocating rotation about the base, and control means for controlling the drive pin advancing and retracting means and the rotator drive means such that the first rod means advances the rotator while the drive pin means is in engagement with the table, thereby advancing the table, and the second rod means retracts the rotator while the drive pin means is out of engagement with the table, whereby the table is rotated forward in increments.

2. An automatic, rotary, glass-making press as in claim 1, the second rod means including rotator cushioning means for cushioning movement of the rotator while the first rod means advances the rotator.

3. An automatic, rotary, glass-making press as in claim 1, the first rod means including a first hydraulic cylinder, the first rod including a first hydraulic piston in the first hydraulic cylinder, the second rod means including a second hydraulic cylinder and the second rod including a second hydraulic piston in the second hydraulic cylinder.

4. An automatic, rotary, glass-making press as in claim 3, the second rod means including rotator cushioning means for cushioning movement of the rotator while the first rod means advances the rotator, the rotator cushioning means including an inner sleeve within the second cylinder defining hydraulic ports, the second hydraulic piston moving within the inner sleeve, the hydraulic ports being positioned such that movement of the second hydraulic piston in the second cylinder progressively closes the hydraulic ports, whereby movement of the rotator while the first rod means advances the rotator is progressively cushioned.

5. An automatic, rotary, glass-making press, the press comprising a base, a rotary table mounted on the base for rotation about an axis, and glass-forming mechanisms on the table and base, for formation of glass articles at work stations around the press, the press further comprising:

a rotator mounted to the base for rotation about said axis;

a drive pin mounted to the rotator for driving the table;

a drive pin advancing and retracting cylinder for advancing and retracting the drive pin into engagement and out of engagement with the table in a direction generally parallel to said axis, and mounted to the rotator for movement with the rotator;

a rotator drive for driving the rotator in reciprocating rotation, the rotator drive including:

a first hydraulic piston, cylinder and rod combination mounted between the base and the rotator for extending and retracting a first rod, the first rod advancing the rotator during the extending of the first rod, and the first rod lying in a plane generally transverse to said axis, a second hydraulic piston, cylinder and rod combination mounted between the base and the rotator for extending and retracting a second rod, the second rod retracting the rotator during extending of the second rod, the second rod lying in the same plane as the first rod, trunnions on the first and second hydraulic cylinders for mounting the first and second hydraulic cylinders to the base for rotation in the same plane as the base and relative to the base, and pins connecting the first and second rods to the rotator, the trunnions and pins providing for arcuate movements of the first and second rods as the rotator moves in reciprocating rotation about the base, and a control for controlling the drive pin advancing and retracting cylinder and the first and second hydraulic cylinders such that the first rod advances the rotator while the drive pin is in engagement with the table, thereby advancing the table, and the second rod retracts the rotator while the drive pin is out of engagement with the table, whereby the table is rotated forward in increments, the second hydraulic cylinder including a rotator cushion for cushioning movement of the rotator while the first rod advances the rotator, the rotator cushion including an inner sleeve within the second cylinder defining hydraulic ports, the second hydraulic piston moving within the inner sleeve, the hydraulic ports being positioned such that movement of the second hydraulic piston in the second cylinder, while the first rod advances, progressively closes the hydraulic ports, whereby movement of the rotator while the first hydraulic cylinder advances the rotator is progressively cushioned.

6. An automatic, rotary, glass-making press as in claim 5, the first and second hydraulic cylinders mounted to the base such that the first and second hydraulic cylinders and the first and second rods are perfectly aligned in a single line in only one position of their movement and such that the cylinders are opposed, with extension of the first rod being in a direction generally opposite to extension of the second rod, and vice versa.

* * * * *